(12) United States Patent
Liu et al.

(10) Patent No.: US 9,766,499 B2
(45) Date of Patent: Sep. 19, 2017

(54) FABRICATING METHOD OF ALIGNMENT FILM

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiaona Liu, Beijing (CN); Yongzhi Song, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/428,570

(22) PCT Filed: Jun. 30, 2014

(86) PCT No.: PCT/CN2014/081237
§ 371 (c)(1),
(2) Date: Mar. 16, 2015

(87) PCT Pub. No.: WO2015/113373
PCT Pub. Date: Aug. 6, 2015

(65) Prior Publication Data
US 2015/0378190 A1    Dec. 31, 2015

(30) Foreign Application Priority Data

Jan. 28, 2014    (CN) .......................... 2014 1 0041962

(51) Int. Cl.
*G02F 1/1337*    (2006.01)
*G02F 1/1333*    (2006.01)

(52) U.S. Cl.
CPC ...... *G02F 1/1337* (2013.01); *G02F 1/133345* (2013.01); *G02F 1/133723* (2013.01);
(Continued)

(58) Field of Classification Search
None
See application file for complete search history.

(56) References Cited

U.S. PATENT DOCUMENTS 6,856,370 B2 * 2/2005 Matsumoto ........... G02F 1/1393
349/141
7,123,319 B2 * 10/2006 Broer .................... C09K 19/00
349/122
(Continued)

FOREIGN PATENT DOCUMENTS

CN    1497310 A    5/2004
CN    1797075 A    7/2006
(Continued)

OTHER PUBLICATIONS

Chinese Office Action of Chinese Application No. 201410041962.1, mailed Nov. 3, 2015 with English translation.
(Continued)

*Primary Examiner* — Nathan T Leong
(74) *Attorney, Agent, or Firm* — Collard & Roe, P.C.

(57) ABSTRACT

The present disclosure relates to a fabricating method of alignment film. The fabricating method of alignment film comprises: forming a blocking layer (2) on a substrate (1); and forming an alignment layer (3) on the blocking layer (2). According to the present disclosure, by way of a layered coating technology, a complete separation of the blocking layer and the alignment layer is achieved. Moreover, since the blocking layer is coated in advance, the alignment layer has a decreased angle with respect to the substrate, which facilitates a uniform distribution of the alignment layer such that the formation of Mura on the panel is effectively avoided. In addition, the blocking layer and the alignment layer are formed in different steps such that the thickness of the blocking layer and the alignment layer is accurately controlled. Therefore, an accurate distribution of capaci-
(Continued)

tance on the blocking layer and the alignment layer is achieved and the residual charge on the alignment layer is effectively reduced.

6 Claims, 2 Drawing Sheets

(52) U.S. Cl.
CPC ............ *G02F 2001/133337* (2013.01); *G02F 2001/133765* (2013.01)

(56) References Cited

U.S. PATENT DOCUMENTS

| | | | |
|---|---|---|---|
| 7,148,941 | B2 | 12/2006 | Nair et al. |
| 8,810,751 | B2 | 8/2014 | Zhong et al. |
| 2004/0075796 | A1* | 4/2004 | Nair ............... G02B 5/3016 349/117 |
| 2004/0189914 | A1* | 9/2004 | Matsuyama ........ G02F 1/13394 349/129 |
| 2009/0231529 | A1* | 9/2009 | Aota ............... G02F 1/133345 349/123 |
| 2011/0261307 | A1 | 10/2011 | Shin et al. |
| 2011/0268895 | A1* | 11/2011 | Jung ............... G02B 5/3083 428/1.3 |

FOREIGN PATENT DOCUMENTS

| | | |
|---|---|---|
| CN | 102809851 A | 12/2012 |
| CN | 103792733 A | 5/2014 |
| WO | 2013/181864 A1 | 12/2013 |

OTHER PUBLICATIONS

International Search Report with Notice of Transmittal of the International Search Report of PCT/CN2014/081237 in Chinese, mailed Oct. 27, 2014.
Written Opinion of the International Searching Authority of PCT/CN2014/081237 in Chinese with English translation mailed Oct. 27, 2014.

* cited by examiner

FABRICATING METHOD OF ALIGNMENT FILM

CROSS REFERENCE TO RELATED APPLICATIONS

This application is the National Stage of PCT/CN2014/081237 filed on Jun. 30, 2014, which claims priority under 35 U.S.C. §119 of Chinese Application No. 201410041962.1 filed on Jan. 28, 2014, the disclosure of which is incorporated by reference.

FIELD

The present disclosure relates to a fabricating method of an alignment film.

BACKGROUND

In the field of thin film transistor liquid crystal display (TFT-LCD), the coating technology of alignment film mainly comprises inkjet and transfer print. Currently, inkjet is commonly used in the line current generation.

The raw material for fabricating the alignment film is generally a mixture material of polyamic acid (FAA) and soluble polyimide (SPI) with a certain proportion.

During fabricating, firstly, the mixture material is coated on a substrate by a nozzle of an inkjet device. Then, the coated substrate is transferred to a curing device by a robot arm. During curing process, a PAA layer and an SPI layer are formed simultaneously utilizing different curing rates of the PAA material and SPI material. The PAA layer is configured to prevent the contamination from other resin layer or metal layer, and the SPI layer is configured to perform an alignment on the liquid crystal molecules. Finally, the SPI layer is performed with a rubbing alignment to form the alignment film.

However, the present inventors recognized that the separating of the mixture material can not be achieved simply by a heating and curing method. At the same time, the PAA layer and the SPI layer do not have a smooth interface, which causes a non-uniform distribution of the SPI layer. Therefore, a Mura appears on the display panel. In addition, the thickness of the respective layers can not be accurately controlled during forming the alignment film.

SUMMARY OF THE INVENTION

The present disclosure provides a fabricating method of alignment film such that the interface between the respective layers in the alignment film is smooth and the thickness of the respective layers is accurately controlled.

The fabricating method of the alignment film comprises the following steps of: forming a blocking layer on a substrate; and forming an alignment layer on the blocking layer The step of forming a blocking layer on a substrate includes: a blocking layer material is coated on the substrate; and the blocking layer material is heated and cured to form the blocking layer in a first prescribed period at a first curing temperature.

The step of forming an alignment layer on the blocking layer includes: an alignment layer material is coated on the blocking layer; and the alignment layer material is heated and cured to form the alignment layer in a second prescribed period at a second curing temperature.

For example, the heating and curing process is performed at an atmosphere pressure.

For example, the first curing temperature is about 50~250° C.; and the second curing temperature is about 50~250° C.

For example, the first curing temperature is higher than the second curing temperature.

For example, the first curing temperature and the second curing temperature have a difference of about 10~20° C.

For example, the first prescribed period is about 20~25 min; and the second prescribed period is about 20~25 min.

For example, the alignment layer has a thickness of about 10~50 nm.

For example, the alignment layer and the blocking layer have a thickness ratio of about 1/15~1/2.

According to the fabricating method of alignment film of the present disclosure, by way of a layered coating technology, a blocking layer is formed on the substrate and an alignment layer is formed on the blocking layer such that a complete separation of the blocking layer and the alignment layer is achieved. In addition, since the blocking layer is coated in advance, the alignment layer has a decreased angle with respect to the substrate, which facilitates a uniform distribution of the alignment layer and effectively avoids the formation of Mura on the display panel. Moreover, the blocking layer and the alignment layer are fainted in different steps such that the thicknesses of the blocking layer and the alignment layer are accurately controlled. Therefore, an accurate distribution of capacitance on the blocking layer and the alignment layer is achieved and the residual charge on the alignment layer is effectively reduced.

DESCRIPTION OF THE EMBODIMENTS

The technical solution of the embodiments of the present disclosure will be described clearly and fully in connection with the drawings of the embodiments of the present disclosure. It is obvious that the described embodiments are just a part but not all of the embodiments of the present disclosure. Based on the described embodiments of the present disclosure, those skilled in the art can obtain all other embodiment without any inventive work, which all fall into the scope of the claimed invention.

Unless otherwise defined, technical terms or scientific terms used herein shall have a common meaning known by those skilled in the art of the present disclosure. Words and expressions such as "first", "second" and the like used in the description and claims of the patent application of the present disclosure do not denote any sequence, quantity or importance, but distinguish different components. Likewise, words such as "a", "an" and the like do not denote quantitative restrictions, but denote the presence of at least one. Words such as "connected", "connecting" and the like are not restricted to physical or mechanical connections, but may include electrical connections, regardless of direct or indirect connections. Words such as "up", "below", "left", "right", etc., are only used to denote the relative positional relationship. Upon the absolute position of the described object changes, the relative positional relationship change correspondingly.

Figure 1:
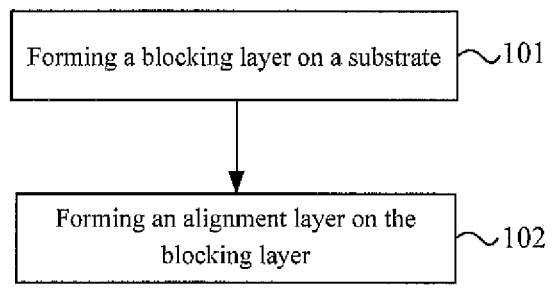
FIG. 1 is a flow chart of the fabricating method of the alignment film according to a first embodiment of the present disclosure.

FIG. 1 is a flow chart of the fabricating method of the alignment film according to a first embodiment of the present disclosure. As illustrated in FIG. 1, the fabricating method comprises: a step 101 of forming a blocking layer on a substrate; and a step 102 of forming an alignment layer on the blocking layer Step 101 includes: a step 111 of coating a blocking layer material on the substrate; and a step 112 of heating and curing the blocking layer material to form the blocking layer in a first prescribed period and at a first curing temperature.

At step 111, a blocking layer material can be coated on the substrate by way of an inkjet coating device. For example, the blocking layer material is a PAA material.

Specifically, firstly, a nozzle for spraying the blocking layer material in the inkjet coating device is positioned over the substrate; then, the nozzle moves across the substrate horizontally at a uniform speed driven by a motor. For example, the speed of the nozzle can be adjusted in a range of about 100~500 mm/s.

Figure 2:
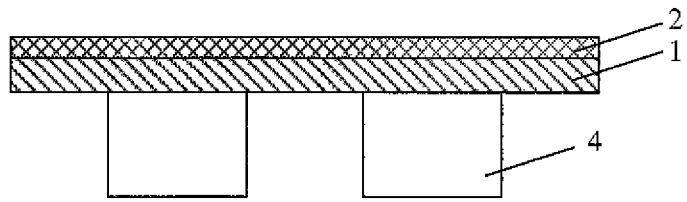
FIG. 2 is a schematic view of curing the blocking layer material.

FIG. 2 is a schematic view of curing the blocking layer material. As illustrated in FIG. 2, at step 112, the substrate 1 coated with the blocking layer material is transferred onto a stage 4 in a curing furnace by a robot arm and the blocking layer material is heated and cured after the substrate 1 is rested on the stage 4. The blocking layer 2 is formed after the first prescribed period. The first prescribed period has a range of for example about 20~25 min and the first curing temperature has a range of for example about 50~250° C.

It should be illustrated that the first prescribed period and first curing temperature can be correspondingly adjusted according to the differences among the blocking layer materials.

Step 102 includes: a step 121 of coating an alignment layer material on the blocking layer; and a step 122 of heating and curing the alignment layer material to form the alignment layer in a second prescribed period at a second curing temperature.

After performing step 101, the substrate 1 with the blocking layer formed thereon in the curing furnace is transferred onto the coating device by the robot arm. The nozzle for spraying the alignment layer material moves across the substrate 1 and coats the alignment layer material on the blocking layer. The procedure of coating the alignment layer material is substantially the same as that of coating the blocking layer, which is not repeated herein. The alignment layer material is for example an SPI material.

Figure 3:
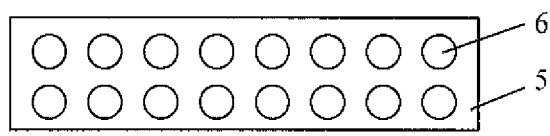
FIG. 3 is a schematic view of the nozzle in the inkjet coating device.

FIG. 3 is a schematic view of the nozzle in the inkjet coating device. As illustrated in FIG. 3, the nozzle 5 in the inkjet coating device is configured with two rows of nozzle mouths 6 with each nozzle mouth 6 connected to a reservoir respectively. In the present embodiment, only one nozzle can be configured to achieve the coating of the block later material as well as the alignment layer material. Specifically, one of the two rows of nozzle mouths 6 is connected to the reservoir of the blocking layer material and the other one of the two rows of nozzle mouths 6 is connected to the reservoir of the alignment layer material. When the coating of the blocking layer material is performed, only one row of the nozzle mouths 6 connected to the reservoir of the blocking layer material is open; and when the coating of the alignment layer material is performed, only one row of the nozzle mouths 6 connected to the reservoir of the alignment layer material is open.

Figure 4:
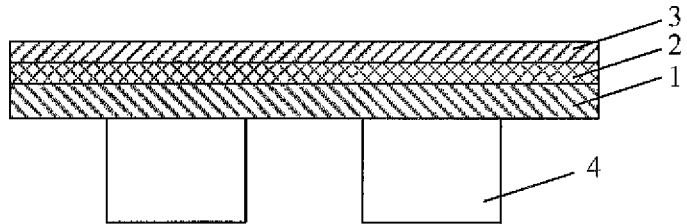
FIG. 4 is a schematic view of curing the alignment layer material.

FIG. 4 is a schematic view of curing the alignment layer material. As illustrated in FIG. 4, at step 122, the substrate 1 coated with the alignment layer material is again transferred onto the stage 4 in the curing furnace by the robot arm and the alignment layer material is heated and cured after the substrate 1 is rested on the stage 4. The alignment layer 3 is formed after a second prescribed period. The second prescribed period has a range of for example about 20~25 min and the second curing temperature has a range of for example about 50~250° C. The second prescribed period and second curing temperature can be correspondingly adjusted according to differences among alignment layer materials.

In the present embodiment, the blocking layer material is the PAA material and the alignment layer material is the SPI material. The first curing temperature is correspondingly higher than the second curing temperature and the first curing temperature and the second curing temperature have a temperature difference with a range of for example about 10~20° C.

It should be illustrated that the curing furnace has an atmosphere pressure when the blocking layer material or the alignment layer material is heated and cured by using the curing furnace.

In the present embodiment, the blocking layer 2 and the alignment layer 3 are formed separately; therefore, the thickness of the blocking layer 2 and the alignment layer 3 can be adjusted freely. Moreover, by using the fabricating method according to the present embodiment, the formed blocking layer 2 and the formed alignment layer 3 can be completely separated such that the blocking effect of the blocking layer 2 and the aligning effect of the alignment layer 3 are effectively enhanced. In addition, by using the fabricating method according to the embodiment, both the blocking layer 2 and the alignment layer 3 have a large uniformity such that the formation of the Mura is effectively avoided.

Moreover, in the present embodiment, the residual charge in the alignment layer is reduced. The principle of reducing the residual charge in the alignment layer according to the embodiment is illustrated in details in combination of the drawings.

Figure 5:
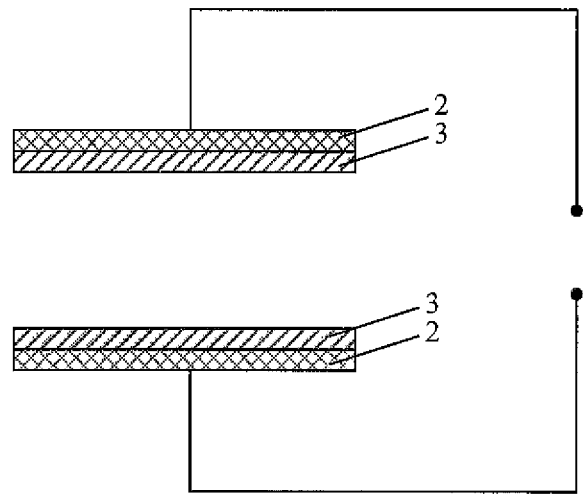
FIG. 5 is a schematic view of two alignment films configured to be opposed to each other.
Figure 6:
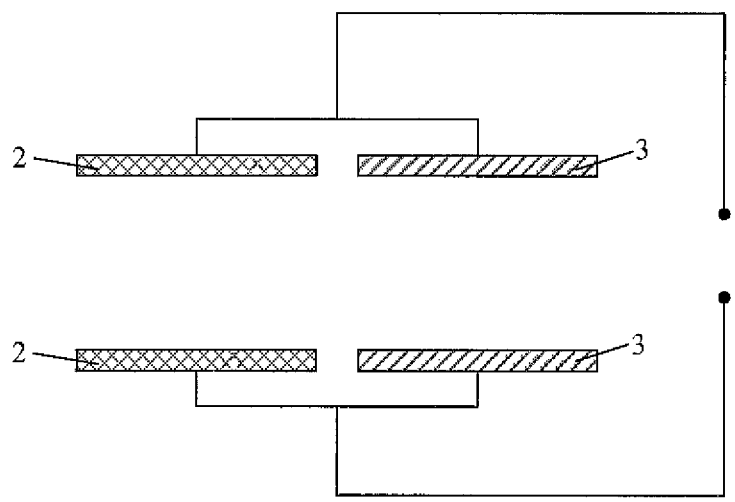
FIG. 6 is a schematic equivalent circuit diagram of FIG. 5.

FIG. 5 is a schematic view of two alignment films configured to be opposed to each other; and FIG. 6 is a schematic equivalent circuit diagram of FIG. 5. As illustrated in FIG. 5 5 and FIG. 5 6, a display panel generally comprises an upper substrate and a lower substrate, with alignment films in both of the upper substrate and the lower substrate. The alignment films are configured to be opposed to each other. When an external electrical signal is applied, capacitances are formed between the alignment in the upper substrate and the alignment in the lower substrate. A first capacitance is formed between the two blocking layers 2 and a second capacitance is formed between the two alignment layers 3, with the first capacitance and the second capacitance connected in a parallel. When the external electrical signal is stable, the electrical signal will be divided by the first capacitance and the second capacitance according to a certain proportion.

The mathematical equation of capacitance is: $C = \in \times \in_0 \times S/d$, where C is capacitance; $\in$ is relative dielectric constant; $\in_0$ is vacuum dielectric constant, S is surface area of the electrode (the blocking layer or the alignment layer) and d is a distance between the electrodes. In the present embodiment, assuming that the alignment film has a constant total thickness, the distance between the blocking layers 2 is reduced without changing the distance between the alignment layers by increasing the thickness of the blocking layers 2 and correspondingly decreasing the thickness of the alignment layers 3. When the distance between the blocking layers 2 of upper and lower substrates is reduced, the value of the first capacitance is increased such that the amount of charges on the blocking layers 2 is increased while the amount of charges on the alignment layers 3 is reduced. This reduces influence of charge on the alignment layers 3 on the deflection of the liquid crystal. Therefore, the display quality of the display device is enhanced.

In the present embodiment, the alignment layer 3 has a thickness of for example about 10~50 nm. The alignment layer 3 with a thickness of for example about 10~50 nm can achieve the alignment function better. The smaller the thickness is, the better the alignment function is, in a case where the alignment film has a constant total thickness.

The alignment layer and the blocking layer have a thickness ratio of 1/15~1/2. The thickness ratio of the alignment layer and the blocking layer can be designed according to display mode of the product and product type. The thickness ratio is preferably smaller in a case where the alignment film has a constant total thickness.

It should be illustrated that the size of the substrate, the size of the display panel and the display mode of the display panel are not limited in the technical solution of the present disclosure, which can be widely applied in production lines for various kinds of display panels.

The embodiment provides a fabricating method of alignment film. By way of the layered coating technology, the blocking layer is formed on the substrate and the alignment layer is formed on the blocking layer such that a complete separation of the blocking layer and the alignment layer is achieved. Moreover, since the blocking layer is coated in advance, the alignment layer has a decreased angle with respect to the substrate, which facilitates a uniform distribution of the alignment layer such that the formation of Mum on the panel is effectively avoided. In addition, the blocking layer and the alignment layer are formed in different steps such that the thickness of the blocking layer and the alignment layer is accurately controlled. Therefore, an accurate distribution of capacitance on the blocking layer and the alignment layer is achieved and the residual charge on the alignment layer is effectively reduced.

It should be understood that the above implementation is presented as an illustrative implementation for illustrating the principle of the present disclosure, not intended to limit the scope of the present disclosure. Those skilled in the art can make various modifications and improvements without departing from the spirit and scope of the present disclosure. These modifications and improvements should be intended to fall into the scope of the present disclosure.

The present application claims the priority of China Patent Application No. 201410041962.1 filed on Jan. 28, 2014, which is incorporated herein by reference in its entirety as part of the present application.

What is claimed is:

1. A fabricating method of an alignment film, comprising following steps of:

forming a blocking layer of polyamic acid (PAA) on a substrate; and forming an alignment layer on the blocking layer, wherein the alignment layer is formed to have a thickness smaller than the blocking layer, wherein the step of forming the blocking layer on the substrate comprises: coating a blocking layer material on the substrate, and heating and curing the blocking layer material to form the blocking layer in a first prescribed period at a first curing temperature in a curing furnace, the first prescribed period having a range of 20~25 min and the first curing temperature having a range of 50~250° C.; and the step of forming the alignment layer on the blocking layer comprises: coating an alignment layer material on the blocking layer, and heating and curing the alignment layer material to form the alignment layer in a second prescribed period at a second curing temperature, the second prescribed period having a range of 20~25 min and the second curing temperature having a range of 50~250° C.

2. The method of claim 1, wherein the heating and curing process is performed at an atmosphere pressure.

3. The method of claim 1, wherein the first curing temperature is higher than the second curing temperature.

4. The method of claim 3, wherein the first curing temperature and the second curing temperature have a difference of 10~20° C.

5. The method of claim 1, wherein the alignment layer has a thickness of 10~50 nm.

6. The method of claim 1, wherein the alignment layer and the blocking layer have a thickness ratio of 1/15~1/2.

* * * * *